United States Patent [19]
Köhn et al.

[11] Patent Number: 5,993,147
[45] Date of Patent: Nov. 30, 1999

[54] PROCESS FOR PALLETIZING STACKS OF FLAT OBJECTS

[75] Inventors: Uwe Köhn, Osnabrück; Andreas Schrödter, Ladbergen; Stefan Lüke, Emsdetten, all of Germany

[73] Assignee: Windmoeller & Hoelscher, Lengerich/Westf., Germany

[21] Appl. No.: 09/035,574

[22] Filed: Feb. 26, 1998

[30] Foreign Application Priority Data

Feb. 28, 1997 [DE] Germany .................. 197 08 258

[51] Int. Cl.[6] .................................................. B65G 57/22
[52] U.S. Cl. ................... 414/802; 414/791.2; 414/791.5
[58] Field of Search .............. 414/791.2, 791.5, 414/792, 792.1, 792.2, 792.3, 792.4, 792.5, 792.6, 902, 802

[56] References Cited

U.S. PATENT DOCUMENTS 3,255,904  6/1966  Annable et al. .
3,729,895  5/1973  Kramer et al. .......................... 414/902
4,500,001  2/1985  Daniels .................................. 414/907
4,774,799  10/1988  Durant .................................. 414/792
5,653,574  8/1997  Lin ...................................... 414/791.5

FOREIGN PATENT DOCUMENTS 2 164 237    7/1972   Germany .
32 21 324   11/1983   Germany .
195 46 389   6/1997   Germany .
310213      12/1990   Japan .................................. 414/792

*Primary Examiner*—Robert P. Olszewski
*Assistant Examiner*—Gregory A. Morse
*Attorney, Agent, or Firm*—Jacobson, Price, Holman & Stern, PLLC

[57] ABSTRACT

To palletize stacks of flat objects, preferably stacks of sacks or bags, the stacks are deposited in several layers one on top of the other on a pallet in such a manner that the stacks of each layer overlap at least two stacks of the layer lying underneath. To palletize stacks of flat objects with higher productivity, large packages, which comprise partially overlapping stacks, are made from at least two stacks before the stacks are deposited.

4 Claims, 1 Drawing Sheet

PROCESS FOR PALLETIZING STACKS OF FLAT OBJECTS

The invention relates to a process for palletizing stacks of flat objects, preferably stacks of sacks or bags, where the stacks are deposited in several layers one on top of the other on a pallet in such a manner that the stacks of each layer overlap at least two stacks of the layer lying underneath.

The U.S. Pat. No. 5,564,893 discloses a process for palletizing stacks of flat objects, wherein a stacking gripper accepts the stacks from a transfer gripper and deposits them on a pallet in several layers according to a predetermined patterns.

In the process of the type described in the introductory part that is known from the DE-U 94 8 577.8, the stacks are fed by a conveyor belt, which travels with its front deflecting roller over the entire surface area of the pallet, whereby there is a stop, which also travels over the entire surface area in selectable predetermined positions. Each stack is deposited on a feeder in the correct position with respect to its later deposit position on the pallet or the pallet stack that is forming in that the stop is moved into a position that corresponds to the desired position of the front edge of the stack, whereby the side orientation of the stack is accomplished by feeding properly onto the conveyor belt. When the stack has reached its front position by being moved against the stop, the front deflecting roller of the conveyor belt returns as soon as the empty belt returns correspondingly, so that the stack spills over its front edge and thus falls on the intercalated feeder. The feeder tosses off the layer of stacks to be stacked by means of a release procedure while maintaining the pattern in which the stack is to be stacked.

The prior art methods for palletizing stacks are very time consuming and thus unproductive, because the stacks to be palletized are oriented and deposited individually.

Therefore, the object of the invention is to provide a process of the type described in the introductory part, according to which stacks of flat objects can be palletized with higher productivity.

The invention solves this problem in that, before the stacks are deposited, large packages, which comprise partially overlapping stacks, are made from at least two stacks.

Thus, according to the invention, before the individual stacks are deposited on the pallets or the pallet stacks that are forming, double packages are made from two stacks in a preceding station; said double packages are then deposited in basically the same manner on the pallets or the pallet stacks that are forming as previously the individual stacks. The formation of the double packages can be done in succession simply and quickly in a preceding station by properly depositing the stacks without increasing the time required to form the pallet stacks. Since, according to the invention, stacks, which are already combined into double packages, are deposited on the pallet or the pallet stack, the stack can be palletized at a much higher rate and thus productivity.

The double packages can be deposited in the customary manner on the pallet or the pallet stack that is forming by conveying apparatuses, for example travelling conveyor belts and/or grippers.

A preferred embodiment provides that to form each layer large packages are deposited next to one another and the large packages of successive layers are offset by 90°. The stacks, deposited into double packages are mutually stabilized by overlapping each other. On the pallet the pallet stack is stable, because the double packages, which lie parallel to each other in each layer, cross each other from layer to layer. In this manner an intrinsically stable pallet stack is produced that does not tend to slip and fall off.

To form large packages it is expedient to combine at least two partially overlapping stacks with their sides in alignment. In this manner longitudinal double packages are formed that can be deposited in a favorable manner crosswise from layer to layer.

A preferred embodiment provides that the stacks, comprising sacks with bottoms that are laid flat, can be combined in such a manner into large packages that the bottoms of the one stack do not overlap the bottoms of the stack above it.

It is expedient to combine in such a manner two stacks, comprising sacks whose bottoms are laid flat, into double packages that the center lines of the bottoms of the one stack lie in the area of the cross center lines of the other stack. From such double packages very stable pallet stacks can be produced, because the stacked bottoms fill the central areas of the sacks, which lie lower in each stack, so that the result is in essence identically thick double packages.

One embodiment of the invention is explained in the following with reference to the drawings.

Figure 2:
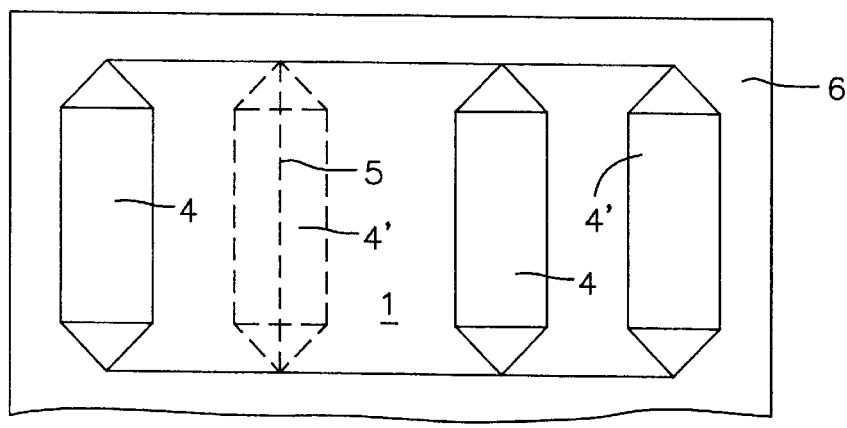
FIG. 2 is a top view of a double package.
Figure 3:
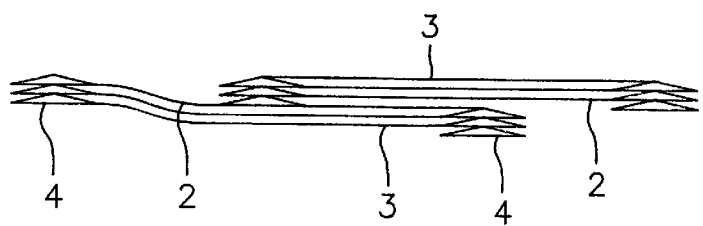
FIG. 3 is a side view of a double package.

FIGS. 2 and 3 show a double package 1, which comprises two offset, stacked stacks 2, comprising flat sacks 3, whose bottoms 4 are laid flat. The stacks 2 are stacked in such a manner that the cross center lines 5 of the bottoms 4 of the one stack lie in the area of the cross center lines of the sacks of the other stack.

It is evident from FIG. 2 that the upper stack of the double package 1 overlaps partially the bottom stack, wherein the long sides of the sacks in both stacks are in alignment, so that the result is a double package extending longitudinally. The upper sack of the upper stack is provided with the bottoms 4 that are laid flat, whereas the flattened bottom of the upper sack of the bottom stacks are marked with the reference numeral 4'.

Each stack comprises an appropriate number of sacks. For example, each stack can contain 15 to 20 stacked sacks that are in alignment.

Figure 1:
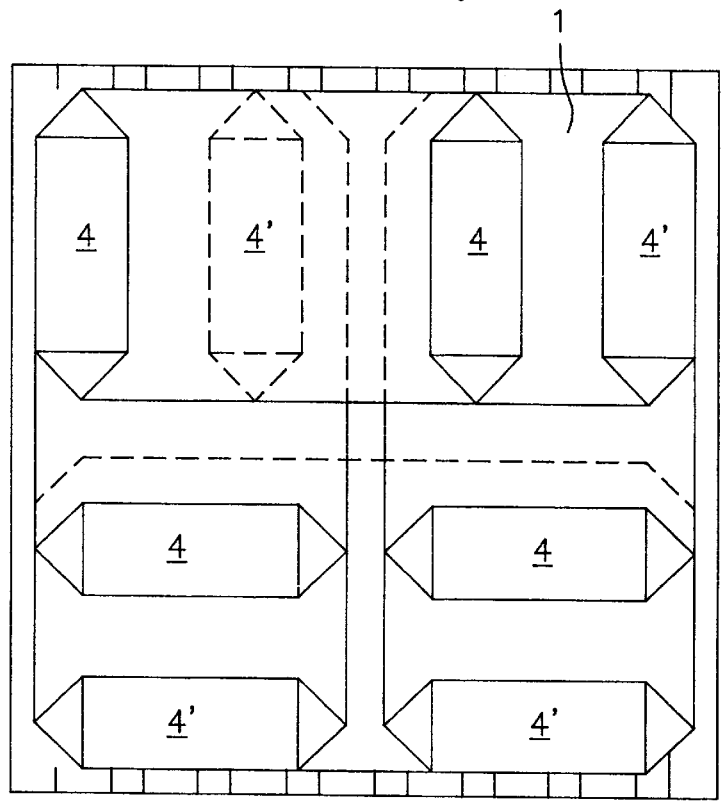
FIG. 1 is a top view of a pallet stack.

The double packages, formed in the manner described, are deposited expediently on the pallet 6 in the pattern depicted in FIG. 1. Thus, the double packages 1 are deposited at a short distance from each other and parallel to each other in each layer, whereby the width of the double packages, lying side by side, corresponds to the length of each double package. By depositing each of the two double packages crosswise in each layer, an essentially square stack is produced whose center exhibits a square shaft.

We claim:

1. Process for palletizing stacks of flat objects, the process comprising:

depositing the stacks in several layers one on top of the other on a pallet in such a manner that the stacks of each layer overlap at least two stacks of the layer lying underneath, and before the stacks are deposited, large packages, which comprise partially overlapping stacks, are made from at least two stacks, and combining the stacks, comprising sacks with bottoms that are laid flat, in such a manner into the large packages that the bottoms of one stack do not overlap the bottoms of the stack above the one stack.

2. Process, as claimed in claim 1, wherein to form each layer, the large packages are deposited next to one another and the large packages of successive layers are offset by 90°.

3. Process, as claimed in claim 1 wherein to form the large packages, at least two partially overlapping stacks are combined with their sides in alignment.

4. Process, as claimed in claim 1, wherein the stacks, comprising sacks whose bottoms are laid flat, are combined in such a manner into double packages that crossed center lines of the bottoms of the one stack lie in an area of crossed center lines of the other stack.

\* \* \* \* \*